June 27, 1961 W. JUNG 2,990,455

CONTROL ARRANGEMENT FOR THE STEREO HEAD OF A TAPE RECORDER

Filed June 24, 1959

INVENTOR.
WERNER JUNG
BY
ATTY.

United States Patent Office 2,990,455
Patented June 27, 1961

2,990,455

CONTROL ARRANGEMENT FOR THE STEREO HEAD OF A TAPE RECORDER

Werner Jung, 9104 McVicker, Morton Grove, Ill.

Filed June 24, 1959, Ser. No. 822,667
9 Claims. (Cl. 179—100.1)

My invention relates in general to a control arrangement for controlling the stereo head of a tape recorder and more specifically to an arrangement for automatically moving the stereo head of a recorder into and out of recording relation with the tape of the recorder when the recorder is switched from monaural to stereo recording or reproducing.

In tape recorders presently in use where a stereo head is provided as an adjunct to the regular monaural heads and where it is possible to switch from one to the other, it has been the practice to leave the stereo head in its recording and reproducing position even while the monaural heads are being used. The stereo heads are thus subject to an excessive amount of wear from the continued passage of the tape therethrough both when recording and/or reproducing by means of the monaural heads and also when the tape is being rewound.

I have therefore provided a moving system whereby the stereo head may be automatically moved into and out of recording relation with the tape depending upon the operation, either of a jack which is used to switch in the external amplifier for stereo recording or the operation of a switch for switching from the monaural to the stereo head. The stereo heads are an expensive item in a recorder and the continuous wear on such heads due to constant rubbing by the passing tape requires that the heads be replaced at frequent intervals. The removal of the head from this rubbing relation with the tape by the method shown herein appreciably extends the life of the heads and is a valuable feature in either a tape recorder where a stereo head has been added as a conversion unit, or where the stereo head is built in as part of the standard equipment.

The main object of the invention therefore is to provide a mechanical arrangement for moving the head into and out of operative relation to the tape and to provide means whereby this arrangement is operated automatically by the operations involved in switching the stereo head into and out of the operating circuits.

The features of invention involved will be apparent from the following detailed description of the accompanying drawings in which.

Figure 1:
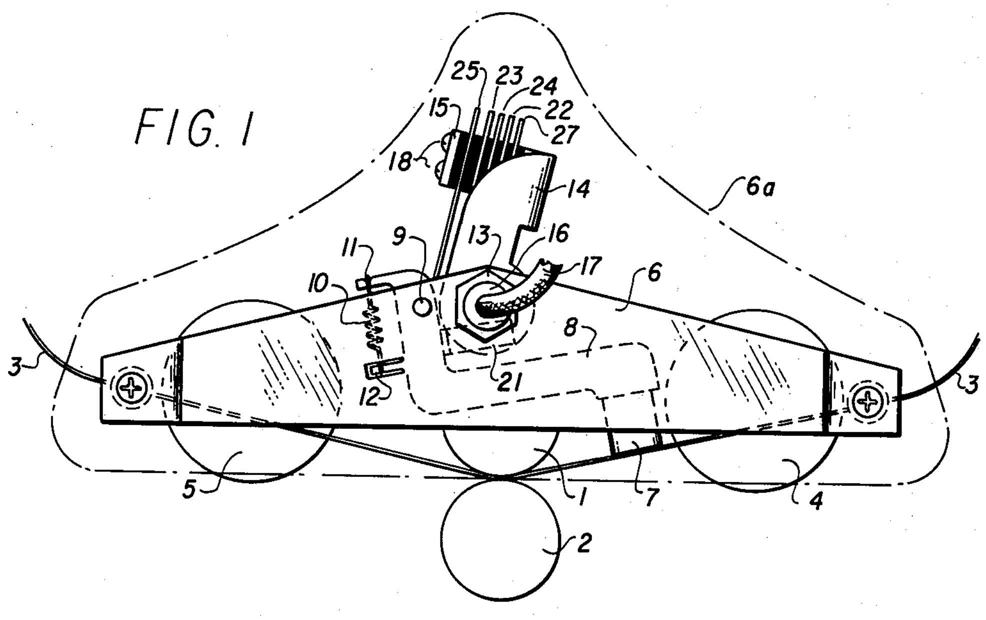
FIG. 1 is a showing of the main elements of the recording heads of the tape recorder and the means for moving the stereo head when an external amplifier is plugged into the recorder for stereo recording or reproducing.

Referring first to FIG. 1, I have shown only the recording and reproducing head mountings of a tape recorder of standard type with the usual driving capstan or roller 1 and the pressure or idler roller 2 which drive the tape 3 through the two monaural heads 4 and 5 which are rigidly mounted in the usual manner under the cover plate 6. The recorder has the usual driving mechanism for rotating the capstan 1 as well as the usual supports holding the tape reels.

In such a machine it is often desirable to provide a stereo head such as I have shown at 7 mounted rigidly on a bracket 8 which is pivoted on a pin 9 so that the head 7 is movable forward and backward from the position shown in FIG. 1 where it is shown in recording relation with the tape 3. I have also provided a spring 10 stretched between an extending arm 11 on bracket 8 and a securing pin 12, which is rigidly mounted on the frame of the machine.

The spring 10 is tensioned so that it tends normally to rotate the mounting bracket 8 in a counter clockwise direction to move the stereo head 7 back away from tape 3. Also secured to top plate 2 by means of a sleeve not shown, externally threaded at its upper end and clamped to plate 6 by means of nut 13, is a spring supporting bracket 14 with a downward and backwardly extending portion 15 to which is secured a spring assembly of the five springs which are operated when a jack 16 is inserted in the opening of the sleeve held by nut 13. The spring assembly is secured to the end 15 of bracket 14 by means of a pair of screws 18. The plug 16 is the usual operator's switchboard plug (shown diagrammatically in FIG. 3) and has a rounded tip 19 at its end which in addition to engaging and moving the spring 20 of the spring assembly, also engages a cam portion 21 which is rigidly attached to bracket 8. The engagement of the rounded tip 19 of the plug with the cam portion 21, moves said portion forward to the position shown in FIG. 1 and thereby moves bracket 8 against the tension of spring 10, to bring the stereo head 7 into operative relation with the tape 3 as shown in FIG. 1. A cover plate 6*a* is shown in dot-dash lines in position over the recording heads.

Figure 3:
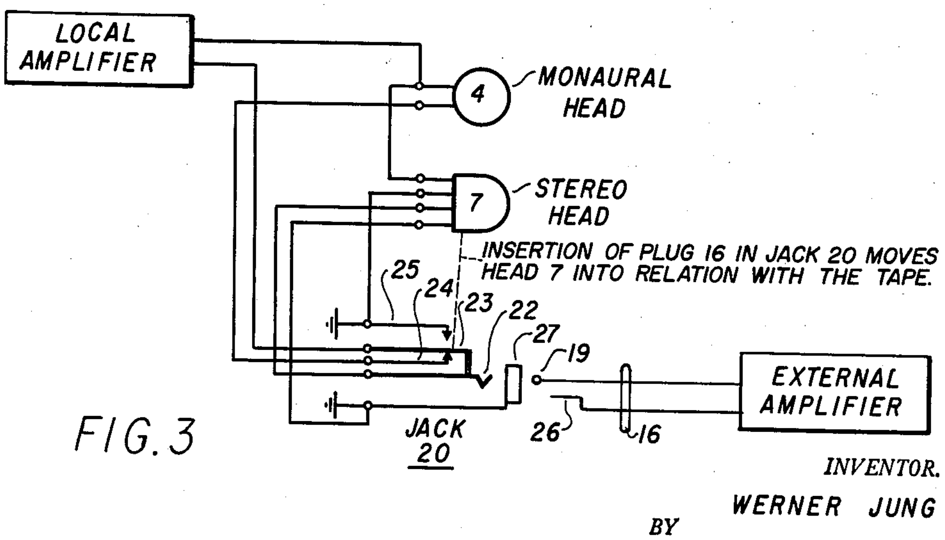
FIG. 3 is a diagrammatic showing of the main elements of the circuit which are controlled by the jack or switch of FIGS. 1 or 2.

Referring to FIG. 3 and the circuit diagram it will be seen that when plug 16 is inserted into jack 20, the rounded tip 19, in addition to moving cam 21, engages the spring 22 to move it outward together with spring 23 due to the insulating bushing connecting these springs. Spring 23 therefore disengages spring 24 and engages spring 25, tip 19 makes contact with spring 22, and sleeve contact 26 of plug 16 engages the sleeve 27 of the jack 20. By this insertion of the plug, the local amplifier is switched from the monaural head 4 to one side of the stereo head 7 and the external amplifier is connected through springs 26 and 27 and 19 and 22 to the other side of stereo head 7.

Thus it will be seen that the mere insertion of the plug switches the circuits from the monaural heads, only one of which is shown in the circuit diagram, to the stereo head and that the stereo head is automatically moved into operative relation with the tape 3. It will also be seen that whenever it is desired to cease use of the stereo head, it is only necessary to remove the plug 16 from the jack 20, to switch the circuits back to monaural operation and to allow the spring 10 to automatically draw the stereo head 7 out of engagement with tape 3 as soon as the plug tip is moved out of the path of cam 21.

Figure 2:
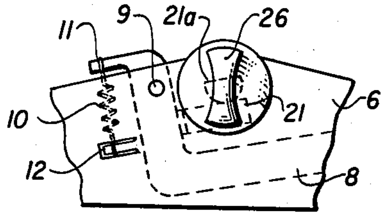
FIG. 2 is a modified form of the invention showing the operating mechanism for moving the stereo head as operated by the turning of a switch or key, which switch is used to switch in the external amplifier.

In FIG. 2, I have shown a modified form of the invention applied to a recorder where the stereo head is wired in permanently and a plug is not used. In such an arrangement, a hand switch such as 28 is used to switch the circuits from monaural to stereo operations. While I have not shown the circuit connections it will be understood that the turning of the switch 26 will close contacts such as 26 and 27 together, close contacts such as 19 and 22, and switch a spring such as 23, from a contact spring 24 to spring 25. In addition this switch 26 has a cam 21*a* on the lower end of its shaft which, when switch 26 is turned to stereo operation, will engage cam 21 to move it downward, as seen in FIG. 2, to move bracket 8 and therefore stereo head 7 into operative relation with tape 3. As before, when switch 26 is turned back to monaural operating position, the spring 10 will return head 7 to its retracted position away from tape 3.

It will thus be seen that I have provided a tape recorder with a stereo head and with means for automatically retracting and advancing the same into relation with the tape as the switching means is operated to connect the head in circuit. Having fully described and ascertained the features and aspects of my invention, what I consider to be novel will be pointed out in the appended claims.

What I claim is:

1. A tape recorder having a monaural head, for stereo head and an amplifier with circuit connections for connecting the amplifier to one or the other of said heads, switching means for switching the circuit connections to connect with either head, a tape, and means automatically operated by the operation of said switching means, for moving said stereo head into and out of operative relation with the tape.

2. In a tape recorder having the usual tape and monaural recording head with means for moving tape relative to the head, a stereo head mounted adjacent the tape and normally out of operative relation therewith, a recording circuit, means for switching the recording circuit to the stereo head, and means automatically operated by the operation of said switching means for moving the stereo head into operative relation with the tape.

3. In a tape recorder having a tape with a monaural recording head mounted in recording relation with the tape, and a local and an external amplifier, said local amplifier normally connected to the monaural head, a stereo head normally out of recording relation with the tape, means for disconnecting the local amplifier from the monaural head and connecting both amplifiers to the stereo head, and means automatically operated by the operation of said first means for advancing said stereo head into recording relation to the tape.

4. In a tape recorder having a tape with means for moving the same and a pair of monaural heads in recording relation to the tape, a bracket carrying a stereo head and pivotally mounted between said monaural heads, a spring normally holding said stereo head out of recording relation with the tape, by holding the bracket in retracted position, an amplifier, means for connecting said amplifier with the stereo head, and a cam on said bracket and automatically engaged by movement of said connecting means, for moving said bracket to bring said stereo head into recording relation with the tape.

5. A tape recorder such as claimed in claim 4 in which said connecting means comprises a plug and jack arrangement and in which the insertion of the plug into the jack causes the plug to engage the cam on said bracket, to move the same.

6. A tape recorder such as claimed in claim 4 in which said connecting means comprises a hand operated switch rotated by hand to connect the amplifier to the stereo head and in which the hand operated switch has a cam surface engaging the cam on said bracket to move the same.

7. In a tape recorder a pair of monaural recording heads set in recording relation to a tape, and means for moving the tape past said heads, a pivoted bracket supporting a stereo head in a position adjacent said tape, a set of switching springs, a local and an external amplifier, said local amplifier normally connected through certain of said springs to the monaural heads, means for moving said springs to disconnect the local amplifier from the monaural heads and connect both amplifiers to the stereo head, and means controlled by the means for moving said springs for also moving said bracket to bring said stereo head into recording relation with the tape.

8. A tape recorder such as claimed in claim 7 in which the springs are part of a plug and jack connection and the plug is connected with the external amplifier, the insertion of the plug in the jack connecting the external amplifier to the stereo head and also mechanically moving the bracket.

9. A tape recorder having a recording head mounted in recording relation to a tape and having means for moving the tape relative to the head, means for connecting the head in circuit for recording or reproducing recordings on said tape, means for retracting said head out of recording relation with the tape, said last means automatically operated by the operation of said connecting means to advance or retract said head depending upon the position of said connecting means.

References Cited in the file of this patent

UNITED STATES PATENTS 2,885,489 Barry ---------------- May 5, 1959